US009471191B2

United States Patent
Li et al.

(10) Patent No.: US 9,471,191 B2
(45) Date of Patent: Oct. 18, 2016

(54) TOUCH PANEL AND TOUCH DISPLAY DEVICE WITH SENSING BARS ARRANGED ALONG ONE-DIMENSIONAL DIRECTION

(71) Applicant: HannsTouch Solution Incorporated, Taipei (TW)

(72) Inventors: Hui-Shu Li, Tainan (TW); Shi-Hao Li, Tainan (TW)

(73) Assignee: HannsTouch Solution Incorporated, Tainan (TW)

( * ) Notice: Subject to any disclaimer, the term of this patent is extended or adjusted under 35 U.S.C. 154(b) by 0 days.

(21) Appl. No.: 14/918,597

(22) Filed: Oct. 21, 2015

(65) Prior Publication Data

US 2016/0041655 A1 Feb. 11, 2016

Related U.S. Application Data

(63) Continuation of application No. 13/854,157, filed on Apr. 1, 2013, now abandoned.

(30) Foreign Application Priority Data

Dec. 26, 2012 (TW) .............................. 101150083 A

(51) Int. Cl.
  *G06F 3/045* (2006.01)
  *G06F 3/044* (2006.01)
  *G06F 3/041* (2006.01)

(52) U.S. Cl.
  CPC ............... *G06F 3/044* (2013.01); *G06F 3/041* (2013.01); *G06F 2203/04103* (2013.01); *G06F 2203/04104* (2013.01)

(58) Field of Classification Search
  CPC .................. G06F 3/041; G06F 3/044; G06F 2203/04104; G06F 2203/04103
  See application file for complete search history.

(56) References Cited

U.S. PATENT DOCUMENTS

| | | | | |
|---|---|---|---|---|
| 8,638,112 B2* | 1/2014 | Day | ........................ | G06F 3/044 178/18.03 |
| 2009/0322355 A1* | 12/2009 | Day | ........................ | G06F 3/044 324/691 |
| 2010/0007624 A1* | 1/2010 | Jiang | ...................... | G06F 3/0414 345/173 |
| 2011/0247884 A1* | 10/2011 | Kim | ........................ | G06F 3/044 178/18.03 |

* cited by examiner

*Primary Examiner* — Kwang-Su Yang
(74) *Attorney, Agent, or Firm* — Winston Hsu; Scott Margo

(57) ABSTRACT

A touch panel includes a substrate and a plurality of sensing units. The sensing units are disposed on the substrate. Each sensing unit includes two sensing bars respectively having a first end and a second end. The sensing bars extend along a direction and cross a touch region. The second end of one of the sensing bars of each sensing unit is configured for receiving a first signal respectively. The first ends of the sensing bars of each sensing unit are electrically connected to each other and configured to receive a second signal. The second end of the other one of the sensing bars of each sensing unit is configured to receive a third signal respectively.

18 Claims, 11 Drawing Sheets

TOUCH PANEL AND TOUCH DISPLAY DEVICE WITH SENSING BARS ARRANGED ALONG ONE-DIMENSIONAL DIRECTION

CROSS REFERENCE TO RELATED APPLICATIONS

This application is a continuation of U.S. application Ser. No. 13/854,157, filed Apr. 1, 2013, which is incorporated herein by reference in its entirety.

BACKGROUND OF THE INVENTION

1. Field of the Invention

The present invention relates to a sensing method of a touch panel.

2. Description of the Prior Art

The touch-sensing panel has been widely used in the input interfaces of the instruments for its properties such as the great interaction between machines and humans. In recent years, more consumer electronics, such as mobile phones, GPS navigator systems, tablet computers, personal digital assistances (PDA), and laptop computers are employed with touch display panels.

In conventional touch panel, two patterned conductive layer are disposed on a transparent substrate, and the patterned conductive layers form a plurality of horizontal sensing stripes and a plurality of vertical sensing stripes. The horizontal sensing stripes are sequentially arranged along a vertical direction, and the vertical sensing stripes are sequentially arranged along a vertical direction, so that the horizontal sensing stripes and the vertical sensing stripes preferably cross each other. Furthermore, each horizontal sensing stripe and each vertical sensing stripe are electrically connected to a signal end of a control device respectively. Accordingly, the horizontal sensing stripes and the vertical sensing stripes can be used to sense a vertical position and a horizontal position of an object touching the touch panel, and the position of the object can be obtained.

However, the conventional touch panel requires two dimensional sensing stripes, so that the two conductive layers are required to form the horizontal sensing stripes and the vertical sensing stripes crossing each other. Additionally, each sensing stripe requires one signal end to control, and thus, the control device should have enough operating ability to perform touch sensing. Therefore, how to simply the touch panel to reduce the cost of the touch panel has become an important task in the field.

SUMMARY OF THE INVENTION

It is therefore an objective of the present invention to provide a touch panel and a touch display device to reduce the cost of the touch panel.

According to an embodiment of the present invention, a touch panel is disclosed. The touch panel includes a substrate and a plurality of sensing units. The substrate has a touch region and a peripheral region. The sensing units are disposed on the substrate. Each sensing unit includes two sensing bars adjacent to each other respectively, and each sensing bar has a first end and a second end respectively. Each first end and each second end are disposed adjacent to two opposite sides of the substrate respectively, and the sensing bars of the sensing units are parallel to each other and extending along a direction to cross the touch region. The second end of one of the sensing bars of each sensing unit is configured for receiving a first signal respectively. The first ends of the sensing bars of each sensing unit are electrically connected to each other and configured for receiving a second signal respectively. The second end of the other one of the sensing bars of each sensing unit is configured for receiving a third sensing signal respectively.

According to an embodiment of the present invention, a touch display device is disclosed. The touch display device includes a display device and a touch panel. The display device has a displaying surface, and the display device includes a plurality of pixels arranged in an array. The touch panel is disposed on the displaying surface, and the touch panel includes a substrate and a plurality of sensing units. The substrate has a touch region and a peripheral region. The sensing units are disposed on the substrate. Each sensing unit includes two sensing bars adjacent to each other respectively, and each sensing bar having a first end and a second end respectively. Each first end and each second end are disposed adjacent to two opposite sides of the substrate respectively, and the sensing bars of the sensing units are parallel to each other and extend along a direction to cross the touch region. The second end of one of the sensing bars of each sensing unit is configured for receiving a first signal respectively. The first ends of the sensing bars of each sensing unit are electrically connected to each other and configured for receiving a second signal respectively. The second end of the other one of the sensing bars of each sensing unit is configured for receiving a third sensing signal respectively.

The sensing units, the first conductive lines, the second conductive lines and the third conductive lines are formed with the same one patterned conductive layer in the present invention, and the single patterned conductive layer can perform a multi-touch function. Thus, the touch panel of the present invention not only can reduce material costs through decreasing one conductive material layer in the manufacturing process, but also reduce the steps of the manufacturing process and the number of masks for forming the patterned conductive material layers to decrease manufacturing cost of the touch panel as compared with the two patterned conductive layers for performing the multi-touch function in the prior art.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
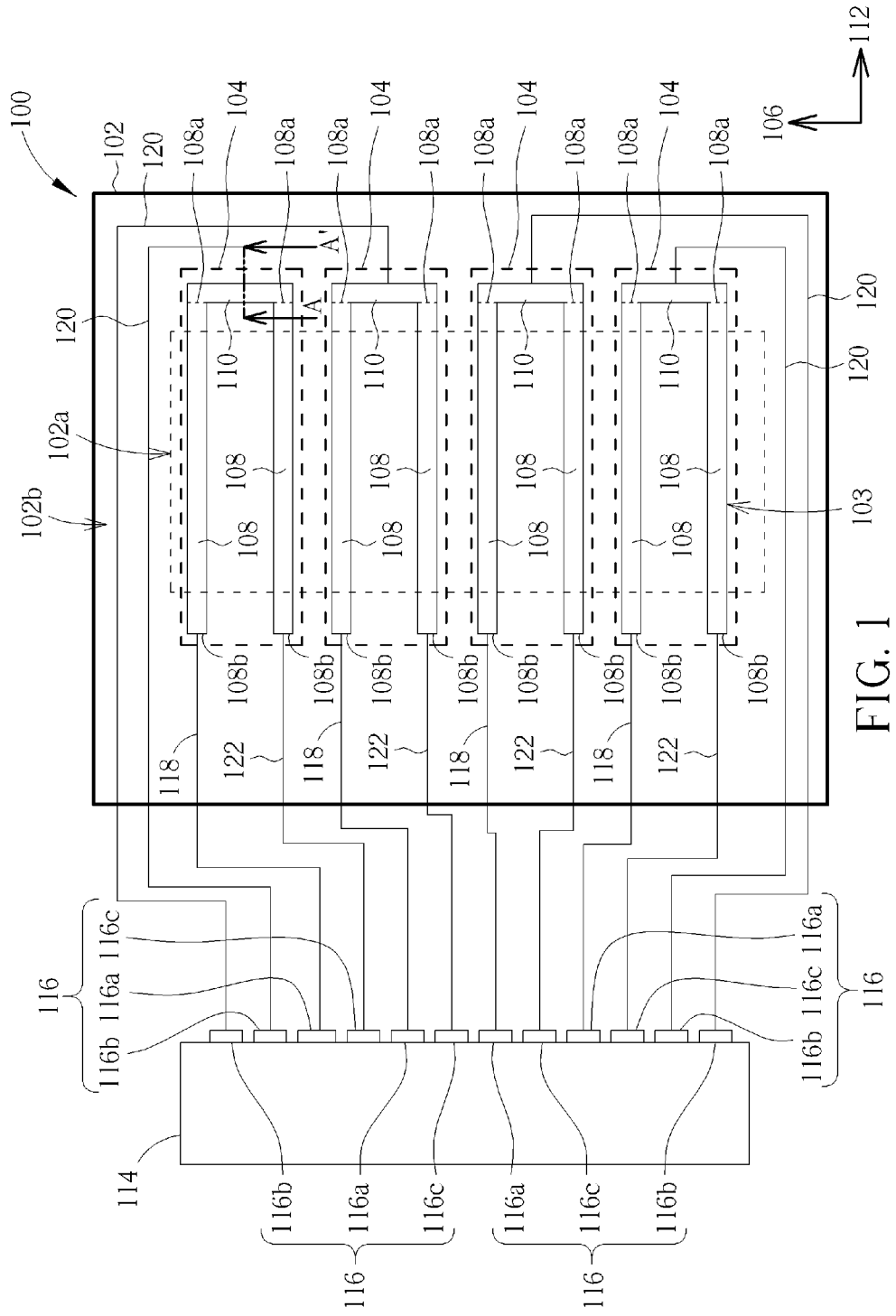
FIG. 1 is a schematic diagram illustrating a top view of a touch panel according to a first embodiment of the present invention.
Figure 2:
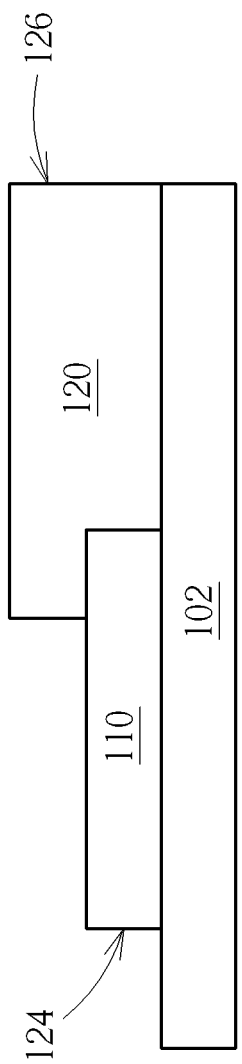
FIG. 2 is a schematic diagram illustrating a cross-sectional view of FIG. 1 taken along a cross-sectional line A-A'.

Please refer to FIG. 1 and FIG. 2. FIG. 1 is a schematic diagram illustrating a top view of a touch panel according to a first embodiment of the present invention. FIG. 2 is a schematic diagram illustrating a cross-sectional view of FIG. 1 taken along a cross-sectional line A-A'. As shown in FIG. 1 and FIG. 2, the touch panel 100 includes a substrate 102, and a patterned conductive layer 103. The patterned conductive layer 103 includes a plurality of sensing units 104. The substrate 102 has a touch region 102a and a peripheral region 102b surrounding the touch region 102a, and the substrate 102 can include a transparent substrate, a color filter substrate, an array substrate or a polarizer, but the present invention is not limited thereto. The transparent substrate can be made of a transparent material, such as glass, quartz or plastic. The sensing units 104 are disposed on the substrate 102 and sequentially arranged along a first direction 106.

In this embodiment, each sensing unit 104 includes two sensing bars 108 and a connecting part 110. The sensing bars 108 of each sensing unit 104 are disposed adjacent to each other and disposed on the substrate 102 in the touch region 102a. The sensing bars 108 are disposed parallel to each other and arranged sequentially along the first direction 106. Each sensing bar 108 extends along a second direction 112 different from the first direction 106, and each sensing bar 108 extends from the substrate in the peripheral region 102b at a side of the touch region 102a to the substrate in the peripheral region 102b at another side of the touch region 102a and crosses the whole touch region 102a. The first direction 106 is perpendicular to the second direction 112 in this embodiment, but the present invention is not limited herein. Furthermore, each sensing bar 108 has a first end 108a and a second end 108b, and the first end 108a and the second end 108b are disposed adjacent to two opposite sides of the substrate 102 respectively. The second end 108b of one of the sensing bars 108 of each sensing unit 104 is configured for receiving a first signal. The first ends 108a of the sensing bars 108 of each sensing unit 104 are electrically connected to each other and configured for receiving a second signal. The second end 108b of the other one of the sensing bars 108 of each sensing unit 104 is configured for receiving a third signal. Since each sensing bar 108 crosses the touch region 102a, each sensing bar 108 should be transparent, and each sensing bar 108 includes a transparent conductive material, such as indium tin oxide or indium zinc oxide, but the present invention is not limited herein. In this embodiment, each connecting part 110 is disposed on the substrate 102 in the peripheral region 102b, and each connecting part 110 connects the first ends 108a of the sensing bars of each sensing unit 104 to each other, so that the sensing bars 108 of each sensing unit 104 can be electrically connected to each other through each connecting part 110 of each sensing unit 104, in which the sensing bars 108 and the connecting part 110 of each sensing unit 104 constitute a U-shaped structure, but the present invention is not limited thereto. Each connecting part 110 in this embodiment also can include a transparent conductive material, such as indium tin oxide or indium zinc oxide, but the present invention is not limited herein. Moreover, the connecting parts 110 and the sensing bars 108 also can be formed with a same transparent conductive material layer 124, but the present invention is not limited herein. In a modified embodiment of the present invention, the connecting part may be disposed on the substrate in the peripheral region, and the connecting part can include opaque conductive material, such as metal, or other conductive material, such as carbon nanotube. In another modified embodiment of the present invention, the sensing bars may not cross the whole touch region, and the sensing bars may extend from the substrate in the touch region adjacent to a side of the peripheral region to the substrate in the touch region adjacent to another side of the peripheral region. In addition, the connecting parts may be formed with the transparent conductive material, and the connecting parts are disposed on the substrate in the touch region and disposed adjacent to a border between the touch region and the peripheral region.

In this embodiment, the touch panel 100 further can include a control unit 114. For example, a sensing chip can be disposed on the flexible circuit board and electrically connected to the sensing units 104 through the flexible circuit board. The control unit 114 includes a plurality of signal terminal sets 116. Each signal terminal set 116 is configured for transmitting a signal to each sensing unit 104 and recording a charging time and a discharging time of the signal transmitting to each sensing unit 104. Each signal terminal set 116 includes a first signal terminal 116a, a second signal terminal 116b and a third signal terminal 116c. The first signal terminal 116a is configured for transmitting the first signal. The second signal terminal is configured for transmitting the second signal. The third signal terminal is configured for transmitting the third signal. The second end 108b of one of the sensing bars of each sensing unit 104 is electrically connected to each first signal terminal 116a so as to receive the first signal. Each connecting part 110 is electrically connected to each second signal terminal 116b of the control unit 114 so as to receive the second signal. The second end 108b of the other one of the sensing bars 108 of each sensing unit 104 is electrically connected each third signal terminal 116c of the control unit 114 so as to receive the third signal. In a modified embodiment of the present invention, the control unit may be directly disposed on the substrate in the peripheral region.

In addition, the patterned conductive layer 103 further includes a plurality of first conductive lines 118, a plurality of second conductive lines 120, and a plurality of third conductive lines 122, and the first conductive lines 118, the second conductive lines 120 and the third conductive lines 122 are disposed on the substrate 102 in the peripheral region 102b. In this embodiment, the first conductive lines 118, the second conductive lines 120 and the third conductive lines 122 are formed with a conductive material layer 126 and disposed on the transparent conductive material layer 124. The conductive material layer 126 may include metal material or transparent conductive material, such as indium tin oxide or indium zinc oxide, but the present invention is not limited herein. Each first conductive line 118 is connected to one of the sensing bars 108 of each sensing unit 104, and each first conductive line 118 is electrically connected to each first signal terminal 116a. Thus, each conductive line 118 can electrically connect each first signal terminal 116a to the second end 108b of one of the sensing bars 108 of each sensing unit 104, and each first signal can be transmitted to the second end 108b of one of the sensing bars 108 of each sensing unit 104. Each second conductive line 120 is connected to the connecting part 110 of each sensing unit 104, and each second conductive line 120 is electrically connected to each second signal terminal 116b. Thus, each second signal can be transmitted to each connecting part 110. Each third conductive line 122 is connected to the other one of the sensing bars 108 of each sensing unit 104, and each third conductive line 122 is electrically connected to each third signal terminal 116c. Thus, each third conductive line 122 electrically connects each third signal terminal 116c to the second end 108b of the other one of the sensing bars 108 of each sensing unit 104, and the third signal can be transmitted to the second end 108b of the other one of the sensing bars 108 of each sensing unit 104. By using the first conductive lines 118, the second conductive lines 120 and the third conductive lines 122 to electrically connect each sensing unit 104 and the control unit 114, the control unit 114 can accurately calculate a resistance between each sensing unit 104 and the control unit 114 so as to obtain differences between the charging times of the first signal, the second signal and the third signal before a touch object, such finger or touch pen, touching the touch panel 100 and the charging times of the first signal, the second signal and the third signal after the touch object touching the touch panel 100 and obtain differences between the discharging times of the first signal, the second signal and the third signal before the touch object touching the touch panel 100 and the discharging times of the first signal, the second signal and the third signal after the touch object touching the touch panel 100 also can be accurately calculated by the control unit 114.

Figure 3:
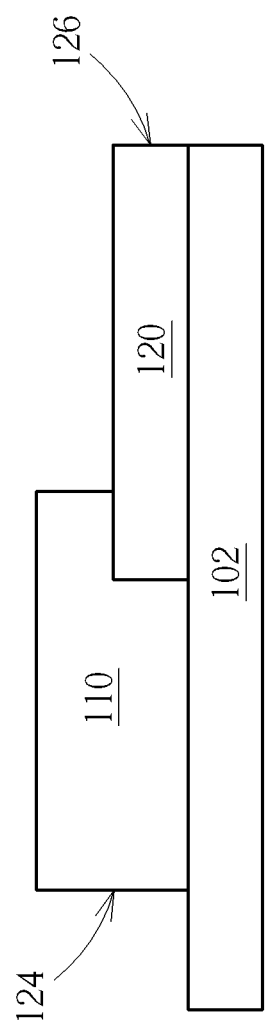
FIG. 3 illustrates a touch panel according to a variant of the first embodiment of the present invention.
Figure 4:
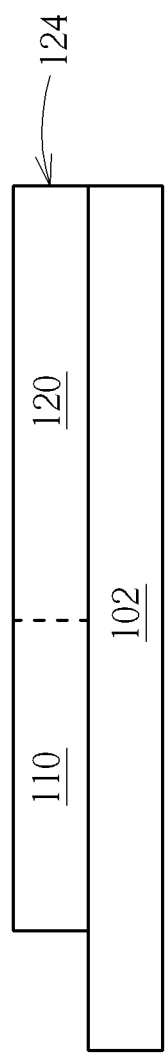
FIG. 4 illustrates a touch panel according to another variant of the first embodiment of the present invention.

In the present invention, the conductive material layer is not limited to be disposed on the transparent conductive material layer, and the conductive material layer is not limited to be formed with the conductive material layer different from the transparent conductive material layer. Please refer to FIG. 3 and FIG. 4. FIG. 3 illustrates a touch panel according to a variant of the first embodiment of the present invention. FIG. 4 illustrates a touch panel according to another variant of the first embodiment of the present invention. As shown in FIG. 3, the transparent conductive material layer 110 of this variant can be disposed on the conductive material layer 126. That is to say that the conductive material layer 126 used for forming the first conductive lines 118, the second conductive lines 120 and the third conductive lines 122 is first formed on the substrate 102, and then, the transparent conductive material layer 110 used for forming the sensing units 104 is formed on the substrate 102 and the conductive material layer 126. As shown in FIG. 4, the conductive material layer used for forming the first conductive lines 118, the second conductive lines 120 and the third conductive lines 122 and the transparent conductive material layer 124 used for forming the sensing units 104 are the same layer. That is to say that the first conductive lines 118, the second conductive lines 120 and the third conductive lines 122 are formed with the transparent conductive material layer 124 used for forming the sensing units 104, which means the first conductive lines 118, the second conductive lines 120, the third conductive lines 122 and the sensing units 104 are integrally formed at the same time. In this variant, the sensing bars 108 of the sensing units 104 is a rectangular stripe-shaped structure, but the present invention is not limited to thereto. In other modified embodiments of the present invention, the sensing bars may be wave-shaped, ragged or irregular striped structure (not shown in figures).

Figure 5:
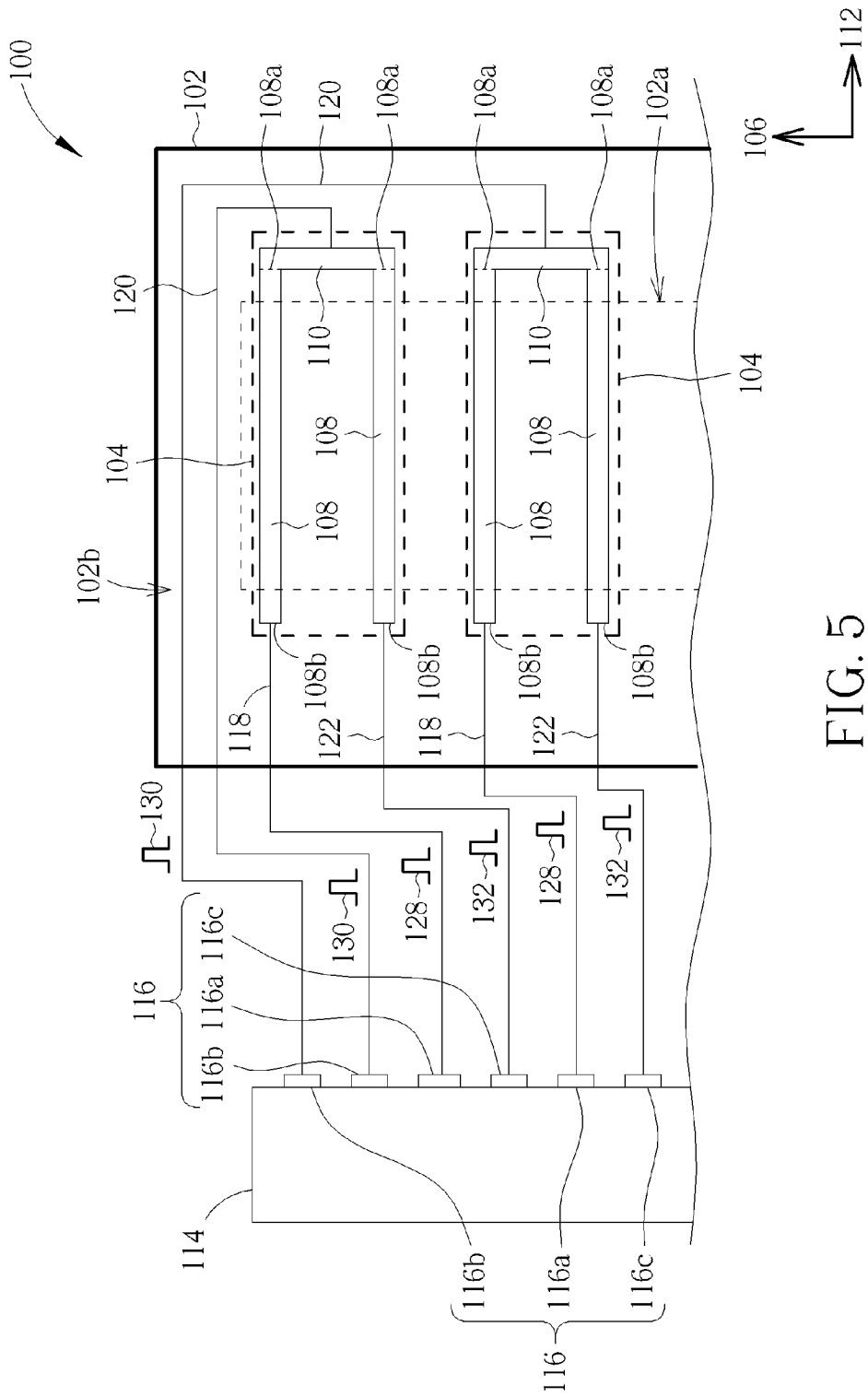
FIG. 5 is a schematic diagram illustrating the touch panel without being touched in the present invention.
Figure 6:
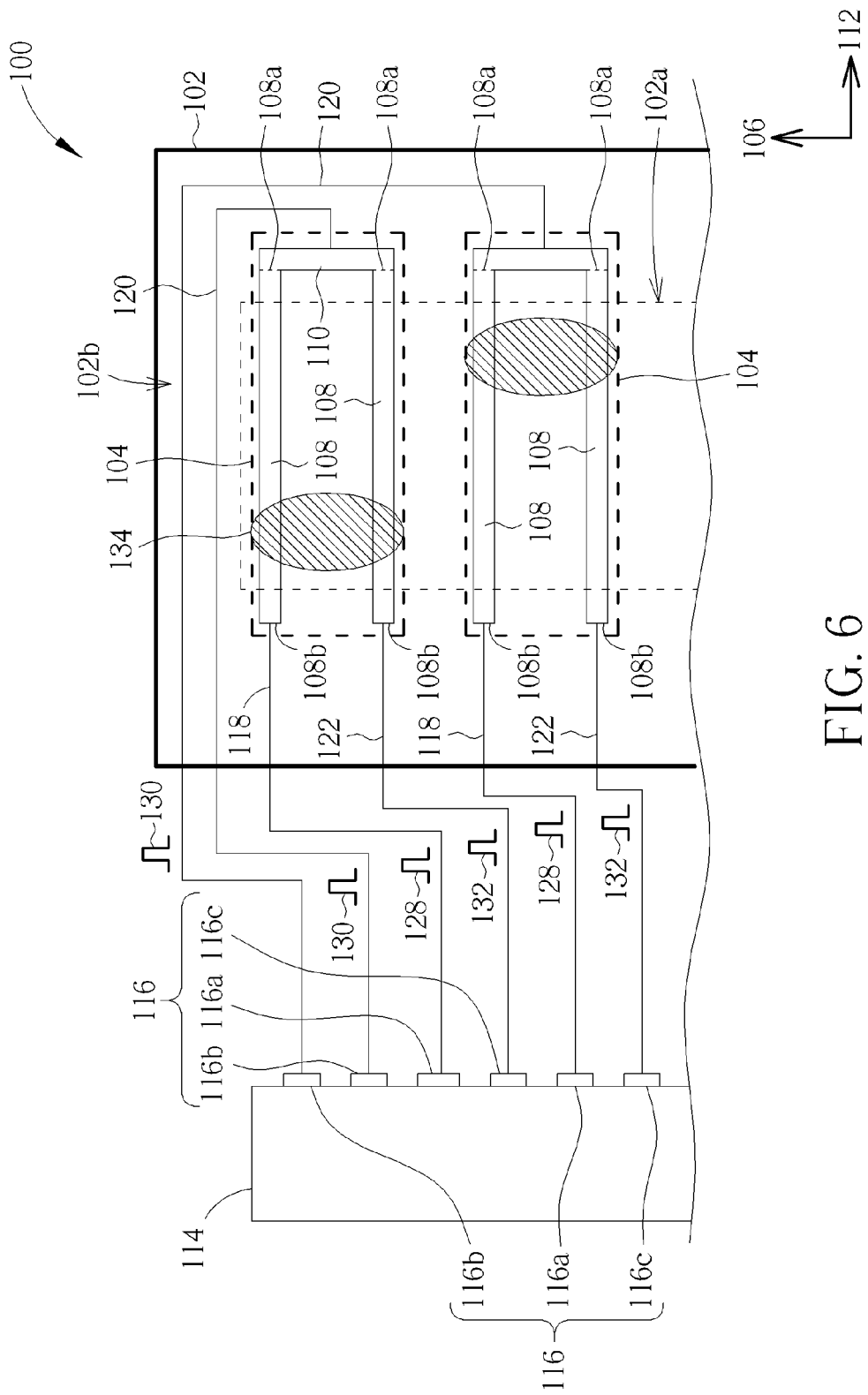
FIG. 6 is a schematic diagram illustrating each sensing unit sensing a single touch object in the present invention.
Figure 7:
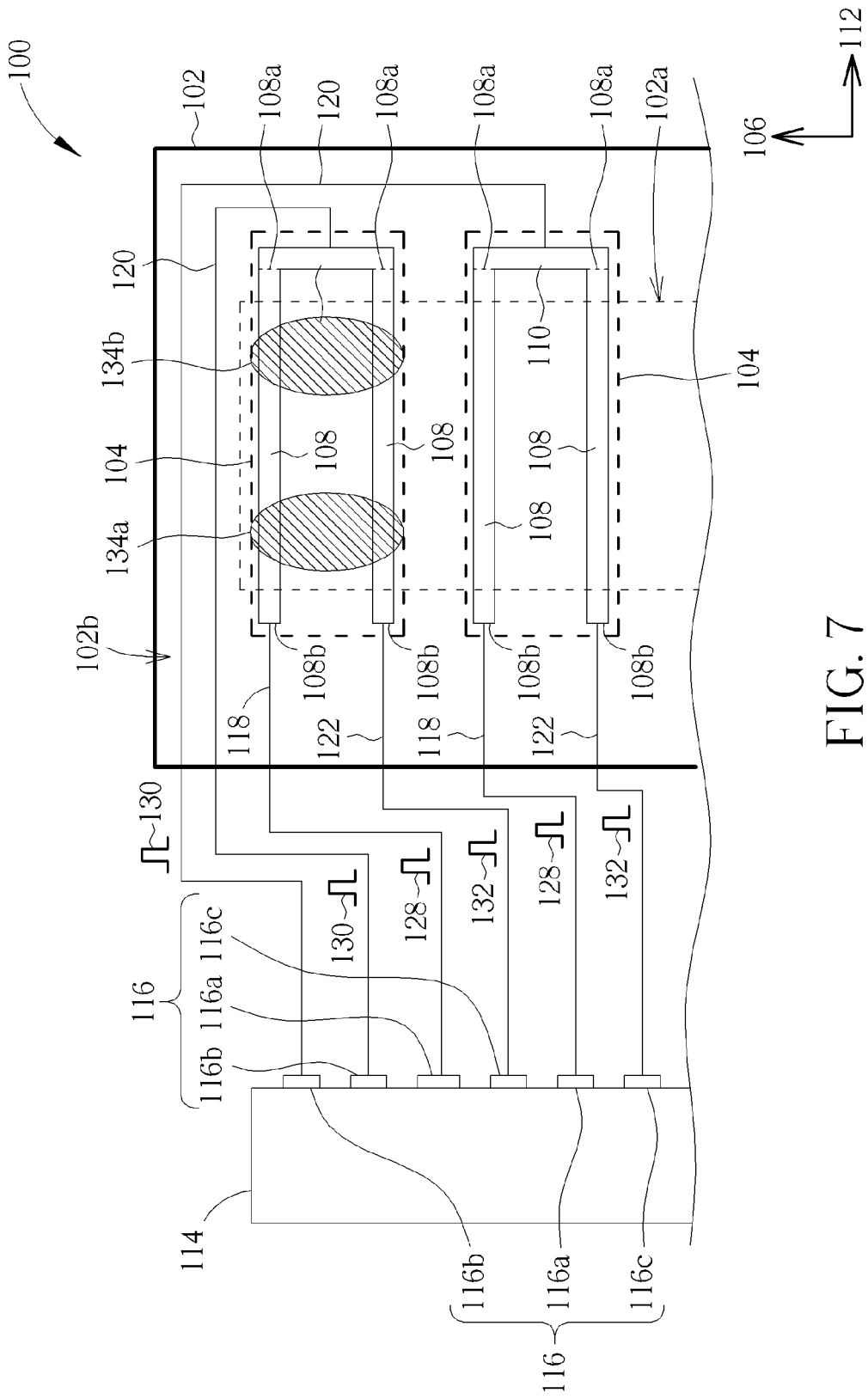
FIG. 7 is a schematic diagram illustrating each sensing unit sensing two touch objects in the present invention.

The method of the sensing unit for sensing the position of the touch object in the present invention is detailed in the following description. Please refer to FIG. 5 through FIG. 7. FIG. 5 is a schematic diagram illustrating the touch panel when no touch object touches the touch panel according to the present invention. FIG. 6 is a schematic diagram illustrating each sensing unit sensing a single touch object according the present invention. FIG. 7 is a schematic diagram illustrating each sensing unit sensing two touch objects according the present invention. As shown in FIG. 5, the control unit 114 transmits the first signals 128, the second signals 130 and the third signals 132 sequentially. Each first signal 128 is transmitted to one of the sensing bars 108 of each sensing unit 104 so as to charge and discharge each sensing unit 104 and record a charging time and a discharging time of each first signal 128 when there is no touch object touching on the touch panel 100. Then, each second signal 130 is transmitted to the connecting part 110 of each sensing unit 104 so as to charge and discharge each sensing unit 104 and record a charging time and a discharging time of each second signal 130. Next, each third signal 132 is transmitted to the other one of the sensing bars 108 of each sensing unit 104 so as to charge and discharge each sensing unit 104 and record a charging time and a discharging time of each third signal 130. As shown in FIG. 6, the control unit 114 further transmits each first signal 128, each second signal 130 and each third signal 132 to one of the sensing bars 108 of each sensing unit 104, the connecting part 110 of each sensing unit 104 and the other one of the sensing bars of each sensing unit 104 respectively, when the touch panel 100 is touched by a plurality of touch objects 134, such as fingers, and each touch object 134 corresponds to each sensing unit 104. Thus, each sensing unit 104 is charged and discharged by the control unit 114, and the charging times and the discharging times of the first signals 128, the second signals 130 and the third signals 132 can be recorded by the control unit 114. Since the touch object 134 is coupled with the each sensing unit 104, the charging times and the discharging times of the first signals 128, the second signals 130 and the third signals 132 when the touch object 134 touches the touch panel 100 are different from the charging times and the discharging times of the first signals 128, the second signals 130 and the third signals 132 when no touch object 134 touches the touch panel 100. Accordingly, the control unit 114 can distinguish and calculate the position of the touch object 134 in the first direction 106. The control unit 114 further compares the charging times and the discharging times of the first signals 128 when the touch object 134 touches the touch panel 100 to the charging times and the discharging times of the first signals 128 when no touch object 134 touches the touch panel 100, and then, the control unit 114 calculates the touch position of the touch object 134 in the second direction 112 according to the lengths of the sensing bars 108. In a modified embodiment of the present invention, the control unit may compare the differences between the charging times and the discharging times of the second signals or third signals when the touch object touches the touch panel and when no touch object touches the touch panel to calculate the positions of the touch object in the first direction and the second direction.

As shown in FIG. 7, when a first touch object 134a and a second touch object 134b touch the touch panel 100 at the same time, and the first touch object 134a and the second touch object 134b corresponds to the same one sensing unit 104, the control unit 114 also sequentially transmits each first signal 128, each second signal 130 and each third signal 132 to one of sensing bars of each sensing unit 104, the connecting part 110 of each sensing unit 104 and the other one of the sensing bars of each sensing unit 104 respectively so as to charge and discharge each sensing unit 104 and record the charging times and the discharging times of the first signals 128, the second signals 130 and the third signals 132. When the control unit 114 transmits the first signal 128, the first signal 128 will encounter the first touch object 134*a* adjacent to the second end 108*b* of one of the sensing bars 108 first. Thus, the control unit 114 can calculate the position of the first touch object 134*a* in the first direction 106 through the changes of the charging times and the discharging times of the first signal 128 generated by the first touch object 134*a*. When the control unit 114 transmits the second signal 130, the second signal 130 will encounter the second touch object 134*b* adjacent to the first ends 108*b* of the sensing bars 108. Thus, the control unit 114 can calculate the position of the second touch object 134*a* in the second direction 112 through the changes of the charging times and the discharging times of the second signal 130 generated by the second touch object 134*b*. Moreover, through the changes of the charging times and the discharging times of the third signal 132, the control unit 114 can verify whether a misjudgment is generated. In another modified embodiment of the present invention, a sequence of the first signal, the second signal and the third signal may be changed; that is, the control unit may sequentially transmit the second signal, the first signal and the third signal, but the present invention is not limited herein.

As we can see from the above-mentioned description, the sensing unit 104, the first conductive lines 118, the second conductive lines 120 and the third conductive lines 122 are formed with the same one patterned conductive layer 103 in this embodiment, and the single patterned conductive layer 103 can perform a multi-touch function. Thus, in this embodiment, the touch panel 100 not only can reduce material costs through decreasing one conductive material layer in the manufacturing process, but also reduce the steps of the manufacturing process and the number of masks for forming the patterned conductive material layers to decrease manufacturing cost of the touch panel as compared with the two patterned conductive layers for performing the multi-touch function in the prior art. Furthermore, the touch panel 100 does not require two-dimensional sensing stripes, and the touch panel 100 can sense the position of the touch object 134 with the sensing units 104 arranged along the one-dimensional first direction 106 in this embodiment, so that the number of the signal terminals that the sensing units 104 require only is three times the number of the sensing units 104. As compared with the number of the signal terminals in the prior art that is the product of the number of the sensing stripes in the first direction and the number of the sensing stripes in the second direction, the number of the signal terminals of the touch panel 100 further can be effectively reduced, and the cost of the touch panel 100 can be decreased in this embodiment.

The touch panel of the present invention is not limited to the above-mentioned embodiment. The following description continues to detail the other embodiments or modifications, and in order to simplify and show the differences between the other embodiments or modifications and the above-mentioned embodiment, the same numerals denote the same components in the following description, and the same parts are not detailed redundantly.

Figure 8:
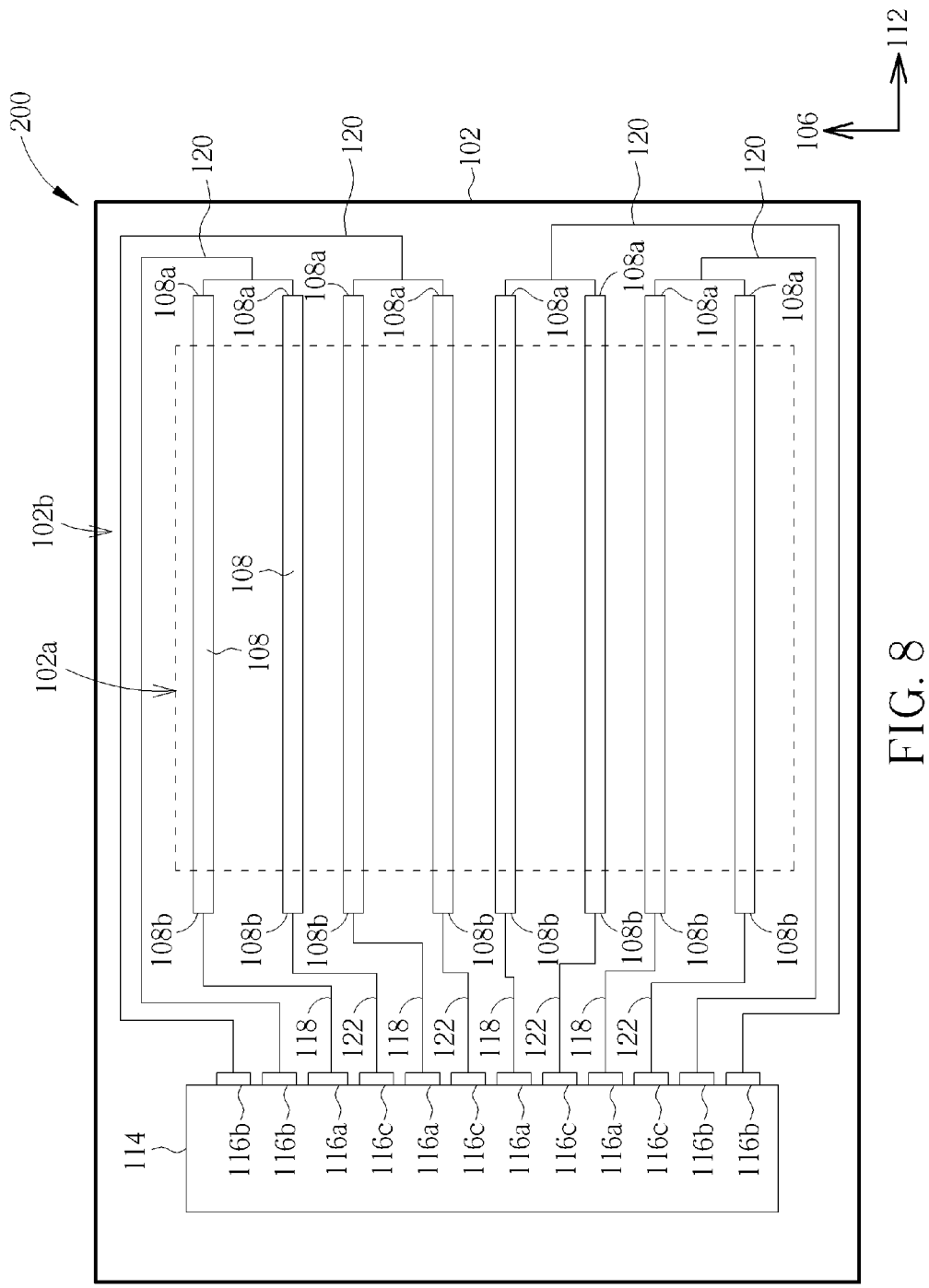
FIG. 8 is a schematic diagram illustrating a touch panel according to a second embodiment of the present invention.

Please refer to FIG. 8. FIG. 8 is a schematic diagram illustrating a touch panel according to a second embodiment of the present invention. As shown in FIG. 8, as compared with the first embodiment, the control unit 114 of the touch panel 200 in this embodiment is disposed on the substrate 102 in the peripheral region 102*b*, and each sensing unit 104 does not include the connecting part. In other words, the first end 108*a* of each sensing bar 108 of each sensing unit 104 is directly connected to each second conductive line 120, so that the first end 108*a* of each sensing bar 108 of each sensing unit 104 can be electrically connected to each second signal terminal 116*b* of the control unit 114.

Figure 9:
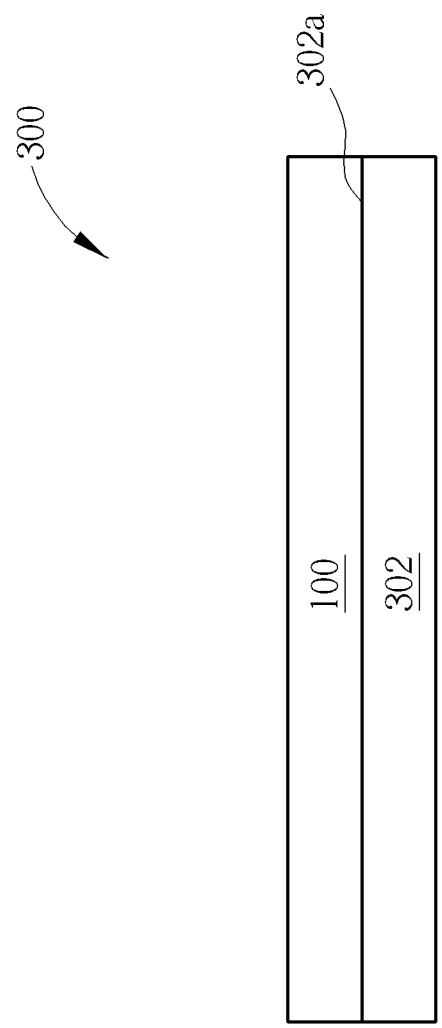
FIG. 9 is a schematic diagram illustrating a cross-sectional view of a touch display device according to an embodiment of the present invention.
Figure 10:
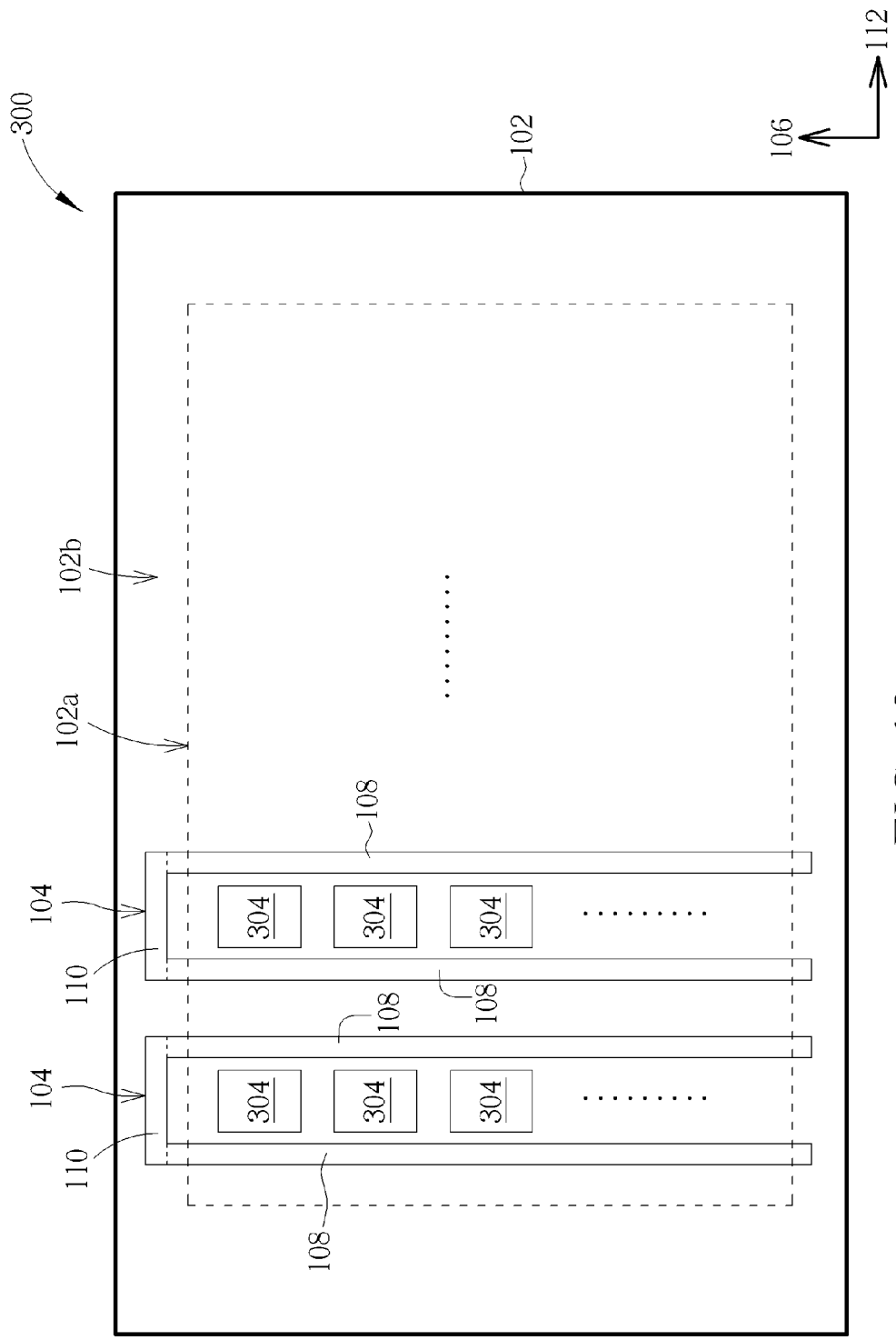
FIG. 10 is a schematic diagram illustrating a top view of the touch display device according to the embodiment of the present invention.

According to the touch panel of the above-mentioned embodiments, the present invention further provides a touch display device. The touch panel in the following description takes the touch panel in the above-mentioned first embodiment as an example, and the present invention is not limited thereto. The touch panel in the following description may be the touch panel of other embodiments. Please refer to FIG. 9 and FIG. 10 together with FIG. 1. FIG. 9 is a schematic diagram illustrating a cross-sectional view of a touch display device according to an embodiment of the present invention. FIG. 10 is a schematic diagram illustrating a top view of the touch display device according to the embodiment of the present invention. As shown in FIG. 1, FIG. 9 and FIG. 10, the touch display device 300 includes a display device 302 and a touch panel 100. The display device 302 has a display surface 302*a*, and the display device 302 includes a plurality of pixels 304 arranged in an array. The display device may be for example a liquid crystal display device, an organic light-emitting diode display device or a plasma display device, but the present invention is not limited thereto. The first direction 106 is the row direction, and the second direction 112 is the column direction in this embodiment. Each sensing unit 104 of the touch panel 304 overlaps at least one column of the pixels 30, so that the sensing unit 104 corresponding to the column of the pixels 304 can sense the touch object touching the region corresponding to at least one pixel 304 in the column of pixels 304. In other words, the sensing bars 108 of each sensing unit 104 corresponding to each column of the pixels 304 overlap the column of the pixels 304 or are disposed at two sides of the column of the pixels 304 respectively. Accordingly, when the touch object touches the region corresponding to at least one pixel 304 in the column of the pixels 304, the sensing unit 104 corresponding to the column of the pixels 304 can sense the touch object and calculate the position of the touch object through the control unit 114. In another modified embodiment of the present invention, each sensing unit of the touch panel can overlap a plurality of columns of the pixels, and the number of the columns of the pixels overlapping each sensing unit is determined according to the size of the touch object.

Figure 11:
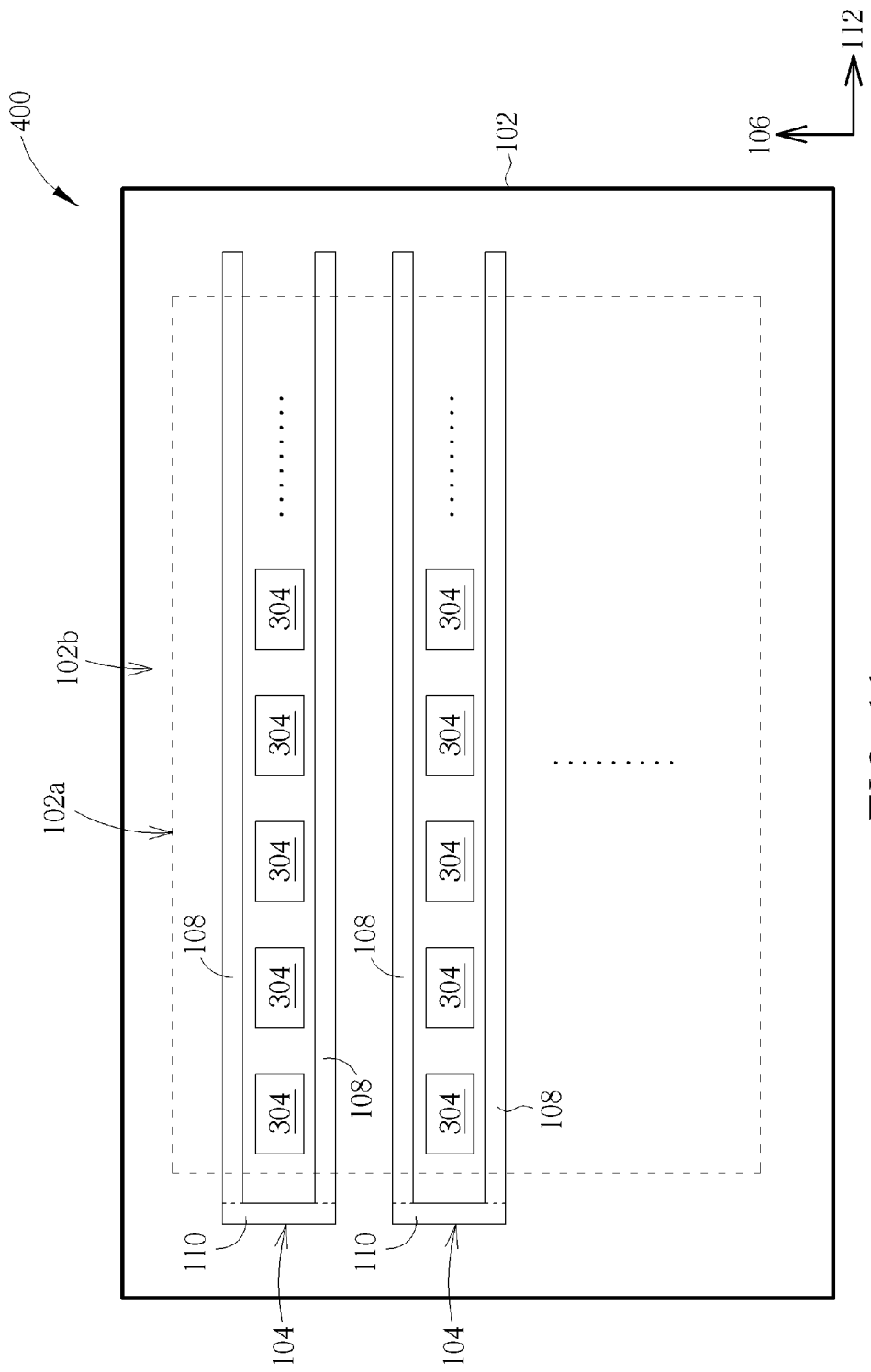
FIG. 11 is a schematic diagram illustrating a top view of a touch display device according to another embodiment of the present invention.

Please refer to FIG. 11. FIG. 11 is a schematic diagram illustrating a top view of a touch display device according to another embodiment of the present invention. As shown in FIG. 11, as compared with the touch display device of the above-mentioned embodiment, the first direction 106 of the touch display device 400 in this embodiment is the column direction, and the second direction 112 is the row direction. In other words, each sensing unit 104 of the touch panel 400 in this embodiment overlaps at least one row of the pixels 304, and the sensing bars 108 of each sensing unit 104 corresponding to each row of the pixels 304 overlap the row of the pixels 304 or are disposed at two sides of the row of the pixel 304 respectively. In another modified embodiment of the present invention, each sensing unit of the touch panel can overlap a plurality of rows of the pixels, and the number of the rows of the pixels overlapping each sensing unit is determined according to the size of the touch object.

In summary, the touch panel of the present invention does not require two-dimensional sensing stripes, and the touch panel can sense the position of the touch object with the sensing units arranged along the one-dimensional first direction. Furthermore, the sensing units, the first conductive lines, the second conductive lines and the third conductive lines are formed with the same one patterned conductive layer in the present invention, and the single patterned conductive layer can perform a multi-touch function. Thus, the touch panel of the present invention not only can reduce material costs through decreasing one conductive material layer in the manufacturing process, but also reduce the steps of the manufacturing process and the number of masks for forming the patterned conductive material layers to decrease production cost of the touch panel as compared with the two patterned conductive layers for performing the multi-touch function in the prior art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A sensing method of a touch panel, comprising:
   providing the touch panel, the touch panel comprising:
      a substrate, having a touch region and a peripheral region; and
      a plurality of sensing units, disposed on the substrate, the sensing units being electrically insulated from one another, each sensing unit comprising a first sensing bar and a second sensing bar adjacent to each other respectively, each first sensing bar having a first end and a second end respectively, each second sensing bar having a third end and a fourth end respectively, each first end and each third end being disposed adjacent to a side of the substrate, each second end and each fourth end being disposed adjacent to another side of the substrate opposite to the side, and the first sensing bars and the second sensing bars of the sensing units being parallel to each other and extending along a direction to cross the touch region, wherein the first end of each first sensing bar and the third end of each second sensing bar of each sensing unit are electrically connected to each other;
   sequentially transmitting a first signal to each of the second ends of the first sensing bars respectively, wherein any two of the second ends of the first sensing bars receive any two of the first signal at different times;
   recording a charging time and a discharging time of each first signal;
   sequentially transmitting a second signal to each of the first ends of the first sensing bars and each of the third ends of the second sensing bars respectively, wherein any two of the first ends of the first sensing bars receive any two of the second signals at different times; and
   recording a charging time and a discharging time of each second signal.

2. The sensing method of the touch panel according to claim 1, wherein the second end and the first end of each first sensing bar receive each first signal and each second signal respectively at different times.

3. The sensing method of the touch panel according to claim 1, wherein in each sensing unit, the first end and the third end receive one of the second signals after the second end receives one of the first signals.

4. The sensing method of the touch panel according to claim 1, further comprising distinguishing a position of a touch object in a first direction through the charging times and the discharging times of the first signals.

5. The sensing method of the touch panel according to claim 4, further comprising:
   comparing the charging times and the discharging times of the first signals when the touch object touches the touch panel to the charging times and the discharging times of the first signals when no touch object touches the touch panel; and
   calculating a position of the touch object in a second direction according to a comparing result.

6. The sensing method of the touch panel according to claim 1, further comprising distinguishing a position of a touch object in a first direction through the charging times and the discharging times of the second signals.

7. The sensing method of the touch panel according to claim 6, further comprising:
   comparing the charging times and the discharging times of the second signals when the touch object touches the touch panel to the charging times and the discharging times of the second signals when no touch object touches the touch panel; and
   calculating a position of the touch object in a second direction according to a comparing result.

8. The sensing method of the touch panel according to claim 1, further comprising calculating a position of a first touch object adjacent to the second end of one of the first sensing bars through the charging times and the discharging times of the first signals and calculating a position of a second touch object adjacent to the first end of the one of the first sensing bars through the charging times and the discharging times of the second signals when the first touch object and the second touch object touch the touch panel at a same time.

9. The sensing method of the touch panel according to claim 1, further comprising:
   transmitting a third signal to each of the fourth ends of the second sensing bars respectively; and
   recording a charging time and a discharging time of each third signal, wherein any two of the fourth ends of the second sensing bars receive any two of the third signals at different times.

10. The sensing method of the touch panel according to claim 9, wherein the second end of each first sensing bar, the first end of each first sensing bar and the fourth end of each second sensing bar receive each first signal, each second signal and each third signal respectively at different times.

11. The sensing method of the touch panel according to claim 9, wherein in each sensing unit, the fourth end receives one of the third signals after the second end receives one of the first signals.

12. The sensing method of the touch panel according to claim 9, wherein in each sensing unit, the fourth end receives one of the third signals after the first end and the third end receive one of the second signals.

13. The sensing method of the touch panel according to claim 9, wherein in each sensing unit, the first end and the third end receive one of the second signals between the second end receiving one of the first signals and the fourth end receiving one of the third signals.

14. The sensing method of the touch panel according to claim 9, further comprising distinguishing a position of a touch object in a first direction through the charging times and the discharging times of the third signals.

15. The sensing method of the touch panel according to claim 14, further comprising:
   comparing the charging times and the discharging times of the third signals when the touch object touches the touch panel to the charging times and the discharging times of the third signals when no touch object touches the touch panel; and
   calculating a position of the touch object in a second direction according to a comparing result.

16. The sensing method of the touch panel according to claim 9, further comprising calculating a position of a first touch object adjacent to the second end of one of the first sensing bars through the charging times and the discharging times of the first signals and calculating a position of a second touch object adjacent to the first end of the one of the first sensing bars through the charging times and the discharging times of the second signals when the first touch object and the second touch object touch the touch panel at a same time.

17. The sensing method of the touch panel according to claim 16, further comprising verifying whether a misjudgment is generated through the charging times and the discharging times of the third signals.

18. The sensing method of the touch panel according to claim 9, wherein the touch panel further comprises a control unit, and wherein the first ends of the sensing units are electrically connected to the control unit separately, the second ends of the sensing units are electrically connected to the control unit separately, the fourth ends of the sensing units are electrically connected to the control unit separately, and the first signals, the second signals and the third signals are transmitted by the control unit.

* * * * *